(12) United States Patent
Tai et al.

(10) Patent No.: US 11,326,236 B2
(45) Date of Patent: May 10, 2022

(54) BLACK FERRITE-BASED STAINLESS STEEL SHEET

(71) Applicant: NIPPON STEEL STAINLESS STEEL CORPORATION, Tokyo (JP)

(72) Inventors: Yoshikazu Tai, Tokyo (JP); Tomoaki Saida, Tokyo (JP); Kazunari Imakawa, Tokyo (JP); Satoshi Suzuki, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 194 days.

(21) Appl. No.: 16/486,956

(22) PCT Filed: Jan. 26, 2018

(86) PCT No.: PCT/JP2018/002452
§ 371 (c)(1),
(2) Date: Aug. 19, 2019

(87) PCT Pub. No.: WO2018/155075
PCT Pub. Date: Aug. 30, 2018

(65) Prior Publication Data
US 2020/0232075 A1 Jul. 23, 2020

(30) Foreign Application Priority Data
Feb. 23, 2017 (JP) .............................. JP2017-032727

(51) Int. Cl.
| | | |
|---|---|---|
| B32B 15/04 | (2006.01) |
| C22C 38/32 | (2006.01) |
| B23K 9/00 | (2006.01) |
| C21D 6/00 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C23C 8/14 | (2006.01) |
| B23K 103/04 | (2006.01) |

(52) U.S. Cl.
CPC ............ *C22C 38/32* (2013.01); *B23K 9/0026* (2013.01); *C21D 6/004* (2013.01); *C21D 9/46* (2013.01); *C22C 38/001* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C23C 8/14* (2013.01); *B23K 2103/05* (2018.08); *C21D 2211/005* (2013.01); *Y10T 428/12611* (2015.01)

(58) Field of Classification Search
None
See application file for complete search history.

(56) References Cited

U.S. PATENT DOCUMENTS

2007/0275264 A1* 11/2007 Hultin ..................... C23C 30/00
428/687
2014/0069619 A1 3/2014 Hiraide et al.
2014/0134039 A1 5/2014 Roscoe

FOREIGN PATENT DOCUMENTS

| CN | 103459636 A | 12/2013 |
|---|---|---|
| JP | S62146252 A | 6/1987 |
| JP | H0433863 B2 | 6/1992 |
| JP | 8239733 A | 9/1996 |
| JP | 09-316625 A | 12/1997 |
| JP | H10259418 A | 9/1998 |
| JP | H10330904 A | 12/1998 |
| JP | H11061376 A | 3/1999 |
| JP | 2000129405 A | 5/2000 |
| JP | 3198979 B2 | 8/2001 |
| JP | 3657356 B2 | 6/2005 |
| JP | 3770995 B2 | 4/2006 |
| JP | 5837258 B2 | 11/2015 |
| JP | 2016183375 A | 10/2016 |
| JP | 2016211076 A | 12/2016 |

(Continued)

OTHER PUBLICATIONS

EP Extended Search Report for corresponding EP18757274.8-1103/3578677 dated Jan. 31, 2020.

(Continued)

*Primary Examiner* — Seth Dumbris

(74) *Attorney, Agent, or Firm* — Birch, Stewart, Kolasch & Birch, LLP

(57) ABSTRACT

Provided is a black stainless steel sheet that has excellent weldability, that can ensure good toughness and corrosion resistance, and that can maintain the blackness of the surface thereof, even after being welded. This black ferrite-based stainless steel sheet having excellent weldability includes, as a base, a stainless steel containing, in mass %, 0.020% or less of C, 1.0% or less of Si, 0.35% or less of Mn, 0.04% or less of P, 0.005% or less of S, 11-25% of Cr, 1.0% or less of Mo, 0.020% or less of N, 0.4% or less of Al, 10(C+N) to 0.3% of Ti, 0.05% or less of Nb, and 0.01% or less of O, and has a surface in which an oxide coating is formed on the base, wherein the surface has a lightness index (L*) satisfying L*≤45, chromaticity indices (a*, b*) satisfying −5≤a*≤5 and −5≤b*≤5, and a blackness (E) satisfying $E=(L^{*2}+a^{*2}+b^{*2})^{1/2} \leq 45$.

8 Claims, No Drawings

(56) References Cited

FOREIGN PATENT DOCUMENTS

WO     WO-2014087648 A1 *   6/2014    ............. C22C 38/48
WO         2014157578 A1    10/2014

OTHER PUBLICATIONS

Irving Melvin Bernstein et al, "Residual and Minor Elements in Stainless Steels", Handbook of Stainless Steels, pp. 14-1 to 14-14, XP002430954 dated Jan. 1, 1977.
CN Office Action issued in the CN Patent Application No. CN201880012948.5; dated Sep. 25, 2020.
Decision to Grant corresponding to JP Application No. 2017-032727; dated Jan. 9, 2018.
International Search Report corresponding to Application No. PCT/JP2018/002452; dated Apr. 24, 2018.
Notice of Reasons for Rejection corresponding to TW Application No. 107104284; dated Oct. 3, 2018.

* cited by examiner

BLACK FERRITE-BASED STAINLESS STEEL SHEET

CROSS REFERENCE TO RELATED APPLICATIONS

This is the U.S. national stage of application No. PCT/JP2018/002452, filed on Jan. 26, 2018. Priority under 35 U.S.C. § 119(a) and 35 U.S.C. § 365(b) is claimed from Japanese Application No. 2017-032727, filed Feb. 23, 2017; the disclosures of which are incorporated herein by reference.

TECHNICAL FIELD

The present invention relates to a ferrite-based stainless steel sheet having excellent weldability as well as designability with a uniform black tone.

BACKGROUND ART

Stainless steel is a material having excellent corrosion resistance and designability, and is used for interior/exterior materials, an exhaust gas passage member, or the like by utilizing a glossy silver-white skin of the pure stainless material. On the other hand, when a design other than the silver-white design is requested, stainless steels having various color tones are applied. As a means for imparting a black tone on a stainless steel, a chemical coloring method, a painting method, an oxidation method, and the like have been adopted.

In the oxidation method, a stainless steel is heated under an oxidizing atmosphere to form an oxide coating imparting a black tone on a surface. The oxidation method can utilize an annealing treatment in the manufacturing process of the stainless steel for the method, and this makes it unnecessary to add another step. Accordingly, the black tone can be imparted inexpensively compared to the chemical coloring method and the painting method.

The blackening treatment of the stainless steel by the oxidation method is affected by a composition and a thickness of the oxide coating. Accordingly, treatment conditions, such as atmosphere, heating temperature, and heating time, should be selected in addition to the chemical component of the stainless steel. For example, Patent Document 1 describes a method for manufacturing a stainless steel having a black tone by heating a stainless steel containing 0.1-1.5 mass % of Ti to a specific temperature range in air. Patent Document 2 describes a dew point suitable for imparting a black tone. Patent Document 3 describes a method of forming a black coating with preferable adhesiveness by heating a stainless steel containing 0.05-1.0% of Ti under an atmosphere with an oxygen concentration of 5-15 vol %. Patent Document 4 describes a method for forming a uniform a black coating by hot-rolling a stainless steel, finishing with an abrasive belt of not less than #150, then cold-rolling at a cold rolling rate of 50% or higher, and oxidizing. Patent Document 5 describes a method for forming an oxide coating having excellent corrosion resistance by controlling a Cr concentration in the Cr-deficient layer immediately under the oxide coating, and an Al concentration in the inner layer of the oxide coating.

Patent Document 1: Japanese Examined Patent Application Publication No. H04-33863
Patent Document 2: Japanese Unexamined Patent Application, Publication No. H11-61376
Patent Document 3: Japanese Patent No. 3198979
Patent Document 4: Japanese Patent No. 3657356
Patent Document 5: Japanese Patent No. 3770995

DISCLOSURE OF THE INVENTION

Problems to be Solved by the Invention

For products such as an exhaust gas system member of an automobile, a steel sheet is processed, then welded and shaped to have a predetermined shape, and subsequently painted on its surface. This painting treatment leads to an increase in a manufacturing cost. In addition, since a product such as an exhaust gas system member is exposed to a high temperature, an appropriate paint should be selected. Thus, an application of black stainless steel sheets having excellent corrosion resistance and designability have been examined for the purpose of eliminating a painting treatment. However, in the black stainless steel sheet blackened by an oxidation method, an oxide coating at a surface may be entangled into a welded portion during welding, which deteriorates toughness of the welded portion. In addition, blackness and corrosion resistance of the black stainless steel sheet may be affected by heating at the time of welding.

An object of the present invention is to provide a black stainless steel sheet having excellent weldability, which has a black tone imparted by an oxidation treatment, and can ensure good toughness and corrosion resistance and further maintain blackness of the surface even after welding.

Means for Solving the Problems

The present inventors have studied to solve the above problems, and found that toughness and corrosion resistance of the welded portion can be favorably ensured and blackness of the surface can be maintained by controlling alloy components of the ferrite-based stainless steel and the oxide coating on the surface of the steel sheet. The present invention was made by these findings. Specifically, the present invention provides the followings.

(1) The present invention relates to a black ferrite-based stainless steel sheet having excellent weldability, including, as a base, a stainless steel containing, in mass %, 0.020% or less of C, 1.0% or less of Si, 0.35% or less of Mn, 0.04% or less of P, 0.005% or less of S, 11-25% of Cr, 1.0% or less of Mo, 0.020% or less of N, 0.4% or less of Al, 10(C+N) to 0.3% of Ti, 0.05% or less of Nb, and 0.01% or less of O, and having a surface in which an oxide coating is formed on the base, wherein the surface has a lightness index (L*) satisfying $L^* \leq 45$, chromaticity indices (a*, b*) satisfying $-5 \leq a^* \leq 5$ and $-5 \leq b^* \leq 5$, and a blackness (E) satisfying $E=(L^{*2}+a^{*2}+b^{*2})^{1/2} \leq 45$.

(2) The present invention may relate to the black ferrite-based stainless steel sheet having excellent weldability according to (1), wherein the stainless steel contains one or more selected from, in mass %, 1.0% or less of Ni, 1.0% or less of Cu, 1.0% or less of V, and 0.01% or less of B.

(3) The present invention may relate to the black ferrite-based stainless steel sheet having excellent weldability according to (1) or (2), wherein the stainless steel contains one or more selected from, in mass %, 0.01% or less of Ca, 0.01% or less of REM, and 0.1% or less of Zr.

(4) The present invention may relate to the black ferrite-based stainless steel sheet having excellent weldability according to any one of (1) to (3), wherein a difference in blackness between a flat portion and a welding heat-affected portion is 10 or less, and a difference in pitting potential between the flat portion and the welding heat-affected portion is 100 mV or less.

(5) The present invention may relate to a welded structure including the black ferrite-based stainless steel sheet according to any one of (1) to (4).

Effects of the Invention

The present invention makes it possible to provide a black stainless steel sheet having excellent weldability, which can ensure good toughness and corrosion resistance and maintain blackness of the surface, and has preferable coat peeling resistance even after welding. The black stainless steel sheet can be applied to press-shaping and weld-processing, and thus, can be widely used for products such as an exhaust gas system member. In addition, the black stainless steel sheet maintains the black tone at its surface even after welding, and thus, can be used without painting.

PREFERRED MODE FOR CARRYING OUT THE INVENTION

Embodiments of the present invention will be explained. The present invention is not limited to the following description.

Specifically, a black ferrite-based stainless steel sheet according to the present invention contains the following components. Note that the percent indication presenting a content of each element described below refers to "mass %", unless otherwise specified.

C is an element inevitably contained in stainless steel. When a C content is reduced, formation of carbides is decreased. The C content, therefore, is preferably 0.020% or less, more preferably 0.015% or less for improving the corrosion resistance and sensitization property of the welded portion. On the other hand, a prolonged period of the refining treatment for reducing the C content results in the increased manufacturing cost. For this reason, the lower limit of the C content may be 0.005% or more.

Si is an alloy component which improves high-temperature oxidation resistance such as scale peeling resistance, and a Si content may be 0.05% or more. On the other hand, an excessive amount of Si lowers ductility of the steel sheet, leading to decrease in processability or low-temperature toughness. Hence, the Si content is preferably 1.0% or less, more preferably 0.7% or less.

Mn is an element effective for improving high-temperature oxidation resistance such as scale peeling resistance, and a Mn content may be 0.04% or more. On the other hand, an excessive amount of Mn decreases processability and weldability. Furthermore, when the Cr content is small, an addition of Mn may facilitate a formation of a martensitic phase, resulting in a possible decrease in processability on the welded portion. Therefore, the Mn content is preferably 0.35% or less, more preferably 0.30% or less.

P and S are elements inevitably contained in stainless steel. These elements reduce toughness of the welded portion, and therefore, it is preferable to reduce their contents as much as possible. The contents of P and S are set to 0.04% or less and 0.005% or less respectively.

Cr is a main alloying element which forms a passive state coating on a surface of stainless steel, and improves pitting corrosion resistance, crevice corrosion resistance, and general corrosion resistance. A Cr content is preferably 11% or more for allowing a uniform oxide coating having a black tone to form. More preferably, the Cr content is 17% or more. On the other hand, an excessive amount of Cr deteriorates mechanical properties and toughness and furthermore leads to a high cost. For that reason, the Cr content is preferably 25% or less. The content may be 23% or less for general use.

Mo is an element, similar to Cr, effective for improving the corrosion resistance level. On the other hand, an excessive amount of Mo allows an oxide coating to form locally during oxidation treatment, and thereby inhibits a formation of a uniform black coating. Furthermore, the formation of the oxide coating on the welding heat-affected portion tends to progress, which widens a difference in the color tone between the welding heat-affected portion and the flat portion, impairing the appearance thereby. For that reason, the Mo content is preferably 1.0% or less, more preferably 0.60% or less.

N is an inevitable impurity and binds to Ti to form nitrides. As described later, Ti is required for forming the black coating, and thus, if the N content is large, an amount of solid-dissolved Ti in the steel is decreased, which inhibits formation of the black coating. In addition, the formed nitrides tend to become a starting point of corrosion, and deteriorates corrosion resistance, particularly pitting corrosion resistance. Furthermore, the nitrides decrease toughness of the welded portion. For that reason, the N content is set to 0.020% or less.

Al is an alloy component which improves oxidation resistance by forming a dense protective oxide coating on the surface of the ferrite-based stainless steel. An Al content may be 0.04% or more. On the other hand, an excessive amount of Al decreases a low-temperature toughness, and therefore, the Al content is preferably 0.4% or less, more preferably 0.10% or less.

Ti is an element having a high affinity with C and N, and accordingly, Ti can form carbonitrides to suppress intercrystalline corrosion. Furthermore, a black coating composed of Ti and Cr oxides is formed by oxidation treatment. Thus, the Ti content is preferably 10 times or more of the C and N contents (mass %). On the other hand, an excessive amount of Ti deteriorates the surface quality and the processability. In addition, the oxide coating is likely to grow ununiformly, resulting in an uneven surface. For that reason, the Ti content is preferably 0.3% or less.

Nb is an element having a high affinity with C and N, similar to Ti, and forms carbonitrides to suppress intercrystalline corrosion. On the other hand, Nb oxides inhibit formation of the black coating originating from Ti and Cr oxides, and makes it difficult to form a uniform oxide coating rich in blackness. For that reason, the Nb content is preferably 0.05% or less, more preferably 0.02% or less.

O is an inevitable impurity and forms an oxide together with Al or the like during welding to decrease toughness. Therefore, it is preferable to reduce the O content as much as possible. For that reason, the O content is set to 0.01% or less.

As necessary, the stainless steel preferably contains at least one of 1.0% or less of Ni, 1.0% or less of Cu, 1.0% or less of V, and 0.01% or less of B.

Ni is an alloy component having effects of improving the corrosion resistance and preventing decrease in processability. A Ni content may be 0.05% or more. On the other hand, Ni is an austenite-producing element, and an excessive amount of Ni may impair a phase balance at the welded portion and furthermore cause a high cost. For that reason, the Ni content is preferably 1.0% or less, more preferably 0.7% or less.

Cu is an important element for improving the corrosion resistance, particularly the pitting corrosion resistance, similar to Mo. A Cu content may be 0.01% or more. On the other hand, an excessive amount of Cu hardens the steel sheet, leading to decrease in processability. For that reason, the Cu content is preferably 1.0% or less, more preferably 0.50% or less.

V is an alloy component which improves high-temperature strength without impairing toughness, and a V content may be 0.01% or more. On the other hand, an excessive amount of V hardens the steel sheet, leading to decrease in processability. For that reason, the V content is preferably 1.0% or less, more preferably 0.50% or less.

B is an alloy component which improves low-temperature toughness, and a B content may be 0.0005% or more. On the other hand, an excessive amount of B lowers the ductility, leading to decrease in processability. For that reason, the B content is preferably 0.01% or less, more preferably 0.0050% or less.

In addition, as necessary, Ca, REM or Zr may be added. Ca, REM or Zr is an alloy component which forms a compound, in preference to S and P inevitably contained in stainless steel, to suppress decrease in toughness of the welded portion. Each content of Ca and REM may be 0.001% or more, and a Zr content may be 0.01% or more. On the other hand, an addition of excessive amounts of these elements harden the steel sheet, leading to decrease in processability, and easily causes a surface flaw during production, which contributes decreased productivity. Therefore, it is preferable to allow the stainless steel to contain at least one of Ca, REM and Zr, with each of Ca and REM contents of 0.01% or less and Zr content of 0.1% or less.

The methods described in Patent Documents 1, 3 and 4 can be applied to the method for manufacturing the black stainless steel sheet using oxidation treatment. For example, a stainless steel slab is hot-rolled, and the resulting hot-rolled coil is annealed and pickled, and then finished with an abrasive belt of not less than #150. Subsequently, the coil is cold-rolled at a cold rolling rate of 50% or higher, then the resulting cold-rolled sheet is annealed under an oxidizing atmosphere at 900° C. or higher for 60 seconds or longer to obtain a black stainless steel sheet. Alternatively, a black stainless steel sheet can be obtained by annealing and pickling a hot-rolled coil, followed by cold-rolling, annealing, pickling, finishing with an abrasive belt of not less than #150, and then annealing under an oxidizing atmosphere at 900° C. or higher for 60 seconds or longer. The black oxide coating can be formed without the finishing step, but it is preferable to carry out finishing for forming a uniform oxide coating. The black stainless steel sheet is shaped into a predetermined shape, and then subjected to welding joint. As a welding means, general MIG welding and TIG welding can be used.

(Color Tone)

In the black stainless steel sheet according to the present invention, the stainless steel as a base has the aforementioned componential composition. Additionally, an appearance of the surface having the oxide coating formed on the base is specified in accordance with CIELAB (L*a*b* color system). At a surface of a test material, a lightness index $L^*$ indicating a lightness, chromaticity indices $a^*$ and $b^*$ indicating color tones, and a blackness $E=(L^{*2}+a^{*2}+b^{*2})^{1/2}$ are set within specific ranges. These numerical values can be obtained by a color tone measurement in accordance with JIS Z 8722. The measurement is carried out at any five points on the flat portion and the welding heat-affected portion, which is 5 mm away from the welded portion, of the steel sheet to obtain an averaged numerical value. The surface of the black stainless steel sheet according to the present invention has $L^*\leq 45$, $-5\leq a^*\leq 5$, $-5\leq b^*\leq 5$ and $E=(L^{*2}+a^{*2}+b^{*2})^{1/2}\leq 45$. Incidentally, the aforementioned blackness E, which is an index generally called a color difference, will be referred to as "blackness" in the present specification.

(Blackness Difference)

In the present specification, the difference between the blackness (E1) of the flat portion and the blackness (E2) of the welding heat-affected portion will be referred to as a blackness difference ΔE. In the black stainless steel sheet, E1 is generally larger than E2. In the case where this magnitude relation is reversed, the blackness difference ΔE can be evaluated by the absolute value of "E1−E2". The black stainless steel sheet according to the present invention has a characteristic that the blackness difference ΔE after welding is 10 or less. Accordingly, the blackness difference of the welding heat-affected portion from the flat portion is small, and an excellent designability can be ensured even after welding. More preferably, the blackness difference ΔE is 5 or less.

(Pitting Potential Difference)

Pitting potential (V'c) is a measure for evaluating whether or not the pitting occurs. Pitting potential higher than the potential of the use environment (natural potential) suppresses an occurrence of pitting. In the present specification, the difference between a pitting potential V'c1 of the flat portion and a pitting potential V'c2 of the welding heat-affected portion will be referred to as a pitting potential difference ΔV'c. In the black stainless steel sheet, V'c1 is generally larger than V'c2. In the case where this magnitude relation is reversed, the pitting potential difference ΔV'c can be evaluated by the absolute value of "V'c1−V'c2". The black stainless steel sheet according to the present invention may have a characteristic that the pitting potential difference ΔV'c after welding is 100 mV or less. Accordingly, decrease in corrosion resistance of the welding heat-affected portion is small compared to that of the flat portion, and therefore, an excellent corrosion resistance can be maintained even after welding. More preferably, the pitting potential difference ΔV'c is 50 mV or less.

EXAMPLES

Hereinafter, Examples of the present invention will be explained. The present invention is not limited to the following description.

Each stainless steel containing chemical components shown in Table 1 (Examples 1 to 8 and Comparative Examples 1 to 11) was melted and hot-rolled to prepare a 3.0 mm thick hot-rolled sheet. The hot-rolled sheet was annealed at 1050° C. for 3 minutes, and then subjected to dry honing to remove oxide coating on the surface. Subsequently, the sheet was cold-rolled to become 1.0 mm thick, subjected to finish annealing at 1030° C. for 1 minute. Then, the obtained sheet was manually polished sequentially using dry abrasive papers No. 120, No. 240 and No. 400 to remove oxide scales on the surface of the steel sheet. The steel compositions in Table 1 are expressed in mass %, the balance includes Fe and inevitable impurities.

Subsequently, for the purpose of blackening the surface of each steel sheet obtained in Examples 1 to 8 and Comparative Examples 1 to 9, the sheet was blackened by heat treatment under air atmosphere at 1050° C. for 3 minutes to prepare a test material (A). Two of the obtained black stainless steel sheets were welded to prepare a test material (B). For welding, MIG welding was carried out using Y310 as a core wire. Additionally, in Comparative Examples 10 and 11, test materials were prepared without blackening treatment. These test materials were subjected to predetermined evaluation tests.

portion, of the test material (B). Thus, a blackness E2 of the welding heat-affected portion was obtained. A blackness difference ΔE of the E2 from the E1, i.e., the blackness of the flat portion obtained by the aforementioned measurement, was calculated. A test material having a blackness difference

TABLE 1

| | C | Si | Mn | P | S | Cr | Mo | N | Al | Ti | Nb | O | Ni | Cu | V | Others (mass %) |
|---|---|---|---|---|---|---|---|---|---|---|---|---|---|---|---|---|
| Example 1 | 0.009 | 0.69 | 0.10 | 0.028 | 0.004 | 11.19 | 0.06 | 0.010 | 0.068 | 0.273 | 0.004 | 0.0029 | 0.12 | 0.04 | 0.03 | |
| Example 2 | 0.006 | 0.31 | 0.29 | 0.026 | 0.001 | 17.59 | 0.05 | 0.012 | 0.050 | 0.244 | 0.013 | 0.0025 | 0.27 | 0.07 | 0.08 | |
| Example 3 | 0.008 | 0.22 | 0.23 | 0.030 | 0.002 | 17.24 | 0.05 | 0.010 | 0.092 | 0.262 | 0.009 | 0.0031 | 0.51 | 0.05 | 0.05 | |
| Example 4 | 0.007 | 0.27 | 0.27 | 0.030 | 0.001 | 17.21 | 0.06 | 0.012 | 0.060 | 0.266 | 0.044 | 0.0027 | 0.08 | 0.44 | 0.56 | |
| Example 5 | 0.007 | 0.29 | 0.18 | 0.031 | 0.001 | 17.19 | 0.55 | 0.011 | 0.044 | 0.268 | 0.013 | 0.0034 | 0.22 | 0.09 | 0.05 | B: 0.0009 |
| Example 6 | 0.006 | 0.29 | 0.22 | 0.031 | 0.001 | 17.36 | 0.08 | 0.012 | 0.065 | 0.242 | 0.005 | 0.0028 | 0.20 | 0.06 | 0.04 | Ca: 0.0032 REM: 0.0054 |
| Example 7 | 0.003 | 0.07 | 0.11 | 0.022 | 0.001 | 17.95 | 0.98 | 0.012 | 0.155 | 0.258 | 0.002 | 0.0035 | 0.12 | 0.05 | 0.06 | |
| Example 8 | 0.010 | 0.22 | 0.18 | 0.029 | 0.001 | 23.51 | 0.96 | 0.014 | 0.087 | 0.260 | 0.003 | 0.0029 | 0.12 | 0.04 | 0.02 | Zr: 0.08 |
| Comparative Example 1 | 0.005 | 0.25 | 0.29 | 0.032 | <u>0.008</u> | 17.64 | 0.07 | 0.009 | 0.068 | 0.212 | 0.006 | 0.0030 | 0.19 | 0.06 | 0.05 | |
| Comparative Example 2 | 0.003 | 0.17 | 0.22 | 0.030 | 0.002 | 17.14 | 0.15 | 0.012 | 0.076 | 0.240 | 0.009 | <u>0.0155</u> | 0.19 | 0.07 | 0.03 | |
| Comparative Example 3 | 0.007 | 0.39 | 0.25 | 0.031 | 0.001 | <u>8.46</u> | 0.11 | 0.009 | 0.072 | 0.166 | 0.003 | 0.0034 | 0.16 | 0.05 | 0.02 | |
| Comparative Example 4 | 0.007 | 0.20 | 0.28 | 0.030 | 0.001 | 17.46 | 0.12 | 0.011 | 0.068 | <u>0.120</u> | 0.010 | 0.0032 | 0.38 | 0.09 | 0.03 | B: 0.0013 |
| Comparative Example 5 | 0.015 | 0.48 | 0.30 | 0.029 | 0.003 | 18.19 | 0.05 | 0.016 | 0.041 | <u>0.002</u> | <u>0.345</u> | 0.0042 | 0.18 | 0.44 | 0.02 | |
| Comparative Example 6 | 0.004 | 0.07 | 0.05 | 0.022 | 0.001 | 17.44 | 0.12 | 0.019 | 0.151 | <u>0.053</u> | <u>0.098</u> | 0.0023 | 0.12 | 0.04 | 0.02 | Zr: 0.09 |
| Comparative Example 7 | 0.005 | 0.23 | 0.15 | 0.031 | 0.001 | 21.90 | <u>1.05</u> | 0.008 | 0.112 | 0.142 | <u>0.200</u> | 0.0032 | 0.14 | 0.04 | 0.01 | Ca: 0.0042 REM: 0.0051 |
| Comparative Example 8 | 0.009 | 0.24 | 0.20 | 0.031 | 0.002 | 18.10 | <u>1.21</u> | 0.010 | 0.090 | 0.211 | 0.008 | 0.0031 | 0.18 | 0.06 | 0.01 | |
| Comparative Example 9 | 0.007 | 0.39 | 0.29 | 0.031 | 0.001 | 16.46 | 0.11 | <u>0.036</u> | 0.072 | <u>0.146</u> | 0.003 | 0.0038 | 0.16 | 0.05 | 0.03 | |
| Comparative Example 10 | 0.006 | 0.31 | 0.29 | 0.026 | 0.001 | 17.59 | 0.05 | 0.012 | 0.050 | 0.244 | 0.013 | 0.0025 | 0.27 | 0.07 | 0.08 | |
| Comparative Example 11 | 0.003 | 0.07 | 0.11 | 0.022 | 0.001 | 17.95 | 0.98 | 0.012 | 0.155 | 0.258 | 0.002 | 0.0035 | 0.12 | 0.05 | 0.06 | |

(The underline indicates a numerical value out of the range according to the present invention.)

(Test for Evaluating Blackness of Flat Portion)

The blackness of the flat portion was evaluated using the test material (A). A lightness index $L^*$, chromaticity indices $a^*$ and $b^*$ were measured at any five points on the surface of the test material (A) to obtain an average value in accordance with CIELAB ($L^*a^*b^*$ color system) by using a spectral colorimeter with a measurement diameter of about 3 mmΦ. A test material satisfying all of $L^* \leq 45$, $-5 \leq a^* \leq 5$ and $-5 \leq b^* \leq 5$, was regarded to pass. A blackness $E1=(L^{*2}+a^{*2}+b^{*2})^{1/2}$ of the flat portion was calculated based on the $L^*$, $a^*$ and $b^*$, and a test material satisfying $E1 \leq 45$ was regarded to pass. Furthermore, a degree of the black tone was visually evaluated. A test material showing no ununiform portion in color tone was regarded to pass (Satisfied), and a test material showing some ununiform portion was regarded as failing (Unsatisfied).

(Test for Evaluating Blackness of Welded Portion)

For the test material (B) which had been subjected to welding, a blackness of the welded portion was evaluated. In the test material (B), the blackness was measured using a spectral colorimeter at any five points on the welding heat-affected portion, which is 5 mm away from the welded ΔE of 5 or less was regarded as excellent (Excellent), a test material having a blackness difference ΔE of more than 5 and not more than 10 was regarded to pass (Satisfied), and a test material having a blackness difference ΔE of more than 10 was regarded as failing (Unsatisfied).

(Test for Evaluating Corrosion Resistance)

The test material (B) was cut out to prepare a corrosion resistance test pieces of 20 mm×15 mm in size. The corrosion resistance test piece of the flat portion was cut out from a site 50 mm away from the welded portion on the test material (B). The corrosion resistance test piece of the welding heat-affected portion was cut out so as to have the welded portion at the center of the test piece. A lead wire was joined to one end of the test piece by spot welding, and a portion other than a test face of 10 mm×10 mm was coated with a silicone resin. The corrosion resistance test piece of the welding heat-affected portion was coated so as to have the welded portion at the center of the exposed test face. The test was carried out under an Ar-degassed condition at 30° C., using a 3.5% NaCl aqueous solution as a test liquid. The test face was wholly immersed in the NaCl aqueous solution, and left for 10 minutes. Then an electric potential was measured by a potentiodynamic method using a potentiostat at a potential sweep rate of 20 mV/min until an anode current density reached 500 µA/cm² from the natural electrode potential, to obtain an anode polarization curve. The noblest value among the potentials corresponding to 100 µA/cm² in the anode polarization curve was defined as the pitting potential.

The pitting potential V'c1 of the flat portion and the pitting potential V'c2 of the welding heat-affected portion on the black stainless steel sheet were individually measured to obtain a pitting potential difference ΔV'c between them. A test piece having a pitting potential difference ΔV'c of 50 mV or less was regarded as excellent (Excellent), a test piece having a pitting potential difference ΔV'c of 100 mV or less was regarded to pass (Satisfied), and a test piece having a pitting potential difference ΔV'c of larger than 100 mV was regarded as failing (Unsatisfied).

(Test for Evaluating Coating Adhesiveness)

The test material (B) was cut out in a size of 50 mm×50 mm to prepare a test piece so as to have the welded portion of the test material (B) at the center of the test piece. The test piece was bent at 90° with R=2 mm perpendicular to the welded portion of the test piece using a compression tester. The presence of peeling of the oxide coating on the welded portion was then visually checked. A test piece showing no peeling was regarded to pass (Satisfied), and a test piece showing some peeling was regarded as failing (Unsatisfied).

(Test for Evaluating Toughness of Welded Portion)

A test piece was prepared in a similar manner to that for the evaluation of the coating adhesiveness. The test piece was bent at 90° with R=2 mm parallel to the welded portion of the test piece using a compression tester. The presence of cracking on the welded portion was then visually checked. A test piece showing no cracking on the welded portion was regarded to pass (Satisfied), and a test piece showing some cracking was regarded as failing (Unsatisfied).

The results of the tests for evaluating the aforementioned blackness, corrosion resistance, coating adhesiveness, and weld toughness are shown in Table 2.

TABLE 2

| | Blackness | | | | | Corrosion | Bendability | |
| --- | --- | --- | --- | --- | --- | --- | --- | --- |
| | Flat portion | | | | | Welded portion | resistance | Coating | Weld |
| | L* | a* | b* | E1 | Color tone | ΔE | ΔV'c | adhesiveness | toughness |
| Example 1 | 42.01 | 0.73 | 1.23 | 42.03 | Satisfied | Satisfied | Satisfied | Satisfied | Satisfied |
| Example 2 | 28.10 | 1.24 | 0.98 | 28.14 | Satisfied | Excellent | Excellent | Satisfied | Satisfied |
| Example 3 | 33.65 | 0.87 | 0.39 | 33.66 | Satisfied | Excellent | Excellent | Satisfied | Satisfied |
| Example 4 | 34.55 | 0.91 | 0.46 | 34.57 | Satisfied | Excellent | Excellent | Satisfied | Satisfied |
| Example 5 | 35.21 | 1.11 | 1.72 | 35.27 | Satisfied | Excellent | Excellent | Satisfied | Satisfied |
| Example 6 | 29.83 | 1.14 | −0.45 | 29.86 | Satisfied | Excellent | Excellent | Satisfied | Satisfied |
| Example 7 | 35.10 | 0.45 | 0.66 | 35.11 | Satisfied | Satisfied | Excellent | Satisfied | Unsatisfied |
| Example 8 | 38.28 | −0.39 | 0.42 | 38.28 | Satisfied | Satisfied | Satisfied | Satisfied | Unsatisfied |
| Comparative Example 1 | 28.02 | 0.71 | 0.98 | 28.05 | Satisfied | Satisfied | Excellent | Satisfied | Satisfied |
| Comparative Example 2 | 34.23 | 0.83 | 0.40 | 34.24 | Satisfied | Satisfied | Excellent | Satisfied | Satisfied |
| Comparative Example 3 | 46.38 | 0.72 | 1.12 | 46.40 | Satisfied | Satisfied | Unsastified | Unsatisfied | Satisfied |
| Comparative Example 4 | 40.05 | 2.42 | 1.68 | 40.16 | Satisfied | Satisfied | Unsastified | Satisfied | Satisfied |
| Comparative Example 5 | 50.20 | 6.43 | 4.25 | 50.79 | Unsatisfied | Satisfied | Satisfied | Satisfied | Satisfied |
| Comparative Example 6 | 44.82 | 4.82 | 3.11 | 45.19 | Unsatisfied | Satisfied | Excellent | Satisfied | Satisfied |
| Comparative Example 7 | 42.05 | 4.32 | 3.44 | 42.41 | Unsatisfied | Satisfied | Satisfied | Satisfied | Satisfied |
| Comparative Example 8 | 42.33 | 2.55 | 1.02 | 42.42 | Unsatisfied | Unsatisfied | Excellent | Satisfied | Satisfied |
| Comparative Example 9 | 37.52 | 5.12 | 2.16 | 37.93 | Satisfied | Satisfied | Unsatisfied | Satisfied | Satisfied |
| Comparative Example 10 | 80.88 | 0.44 | 0.44 | 80.88 | Unsatisfied | Unsatisfied | Unsatisfied | — | Satisfied |
| Comparative Example 11 | 81.56 | 0.54 | 0.46 | 81.56 | Unsatisfied | Unsatisfied | Unsatisfied | — | Satisfied |

(The underline indicates a numerical value out of the range according to the present invention.)

As shown in Table 2, the black stainless steel sheets of Examples 1 to 8, included in the scope of the present invention, showed small differences in the blackness and corrosion resistance between the flat portion and the welding heat-affected portion. Furthermore, in Examples 1 to 8, it was also found that the welded portion had excellent coating adhesiveness, and at the same time, had good toughness.

On the other hand, in Comparative Examples 1 to 9, the black stainless steel sheets had componential compositions out of the range according to the present invention, and therefore were inferior in any of blackness, corrosion resistance, coating adhesiveness and weld toughness to Examples 1 to 8. Since Comparative Example 1 had an S content of more than 0.005%, and Comparative Example 2 had an oxygen content of more than 0.01%, both of them had poor weld toughness. In Comparative Example 3, the Cr content was less than 11%, thus any black oxide coating was not formed. The blackness was out of the range according to the present invention, and furthermore the corrosion resistance and the coating adhesiveness of the heat-affected portion were decreased. In Comparative Example 4, the Ti content is less than 10 times the sum of C and N, and therefore, the corrosion resistance of the welding heat-affected portion was decreased. In Comparative Examples 5 and 6, the Ti content was less than 10 times the sum of C and N, and the Nb content was more than 0.05%. Accordingly, the blackness was out of the range according to the present invention. Furthermore, the coating was ununiformly formed, and therefore, the color tone was ununiform. In Comparative Examples 7 and 8, the Mo content was more than 1.0%. Thus, oxidation at the welding heat-affected portion locally progressed by heating during welding, and therefore, the difference in the color tone between the welding heat-affected portion and the flat portion became clear. In Comparative Example 9, the N content was more than 0.020%. Thus, black oxide coating was not formed, and therefore, the blackness was out of the range according to the present invention. Furthermore, the corrosion resistance of the welding heat-affected portion was decreased.

Comparative Examples 10 and 11 were reference examples which had the componential compositions within the range according to the present invention but were not subjected to the blackening oxidation treatment. As a result of the test for evaluating the appearance and the corrosion resistance after welding, there were clear differences between the flat portion and the welding heat-affected portion. It was confirmed that the oxide coating formed by the blackening treatment contributed to secure good corrosion resistance even after welding, in addition to designability imparting the black surface on the stainless steel sheet.

The invention claimed is:

1. A black ferrite-based stainless steel sheet, comprising, as a base, a stainless steel containing, in mass %, 0.020% or less of C, 1.0% or less of Si, 0.35% or less of Mn, 0.04% or less of P, 0.005% or less of S, 17-25% of Cr, 0.60% or less of Mo, 0.020% or less of N, 0.4% or less of Al, 10(C+N) to 0.3% of Ti, 0.05% or less of Nb, 0.01% or less of O, and the balance comprising Fe and impurities, and having a surface in which an oxide coating is formed on the base,
wherein the surface has a lightness index ($L^*$) satisfying $L^* \leq 45$, chromaticity indices ($a^*$, $b^*$) satisfying $-5 \leq a^* \leq 5$ and $-5 \leq b^* \leq 5$, and a blackness (E) satisfying $E = (L^{*2} + a^{*2} + b^{*2})^{1/2} \leq 45$, and
wherein a difference in blackness between a flat portion in the stainless steel sheet before being welded and a welding heat-affected portion in the stainless steel sheet welded is 5 or less, and a difference in pitting potential between the flat portion and the welding heat-affected portion in the stainless steel sheet welded is 50 mV or less.

2. The black ferrite-based stainless steel sheet according to claim 1, wherein the stainless steel contains one or more selected from, in mass %, 1.0% or less of Ni, 1.0% or less of Cu, 1.0% or less of V, and 0.01% or less of B.

3. The black ferrite-based stainless steel sheet according to claim 1, wherein the stainless steel contains one or more selected from, in mass %, 0.01% or less of Ca, 0.01% or less of REM, and 0.1% or less of Zr.

4. A welded structure comprising the black ferrite-based stainless steel sheet according to claim 1.

5. The black ferrite-based stainless steel sheet according to claim 2, wherein the stainless steel contains one or more selected from, in mass %, 0.01% or less of Ca, 0.01% or less of REM, and 0.1% or less of Zr.

6. A welded structure comprising the black ferrite-based stainless steel sheet according to claim 2.

7. A welded structure comprising the black ferrite-based stainless steel sheet according to claim 3.

8. A welded structure comprising the black ferrite-based stainless steel sheet according to claim 5.

* * * * *